*J. R. Thomas,*

*Cultivator.*

No. 109,558.  Patented Nov. 22, 1870.

Witnesses:  Inventor:
  J. R. Thomas
  Per
  Attorneys.

UNITED STATES PATENT OFFICE.

JOHN R. THOMAS, OF MIFFLIN, PENNSYLVANIA.

IMPROVEMENT IN COTTON-CULTIVATORS AND PLOWS.

Specification forming part of Letters Patent No. 109,558, dated November 22, 1870.

*To all whom it may concern:*

Be it known that I, JOHN R. THOMAS, of Mifflin, in the county of Juniata and State of Pennsylvania, have invented a new and Improved Plow and Cotton-Cultivator; and I do hereby declare the following to be a full, clear, and exact description of the same, reference being had to the accompanying drawings, making a part of this specification, in which—

Figure 1:
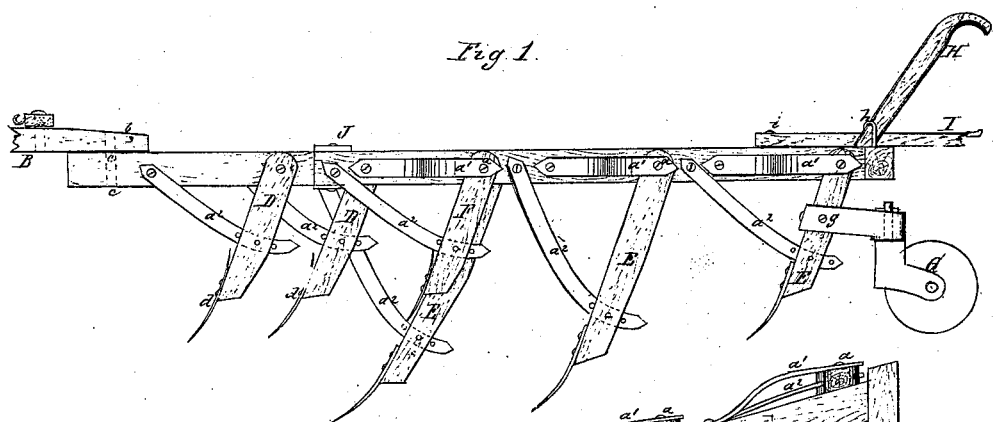
Figure 2:
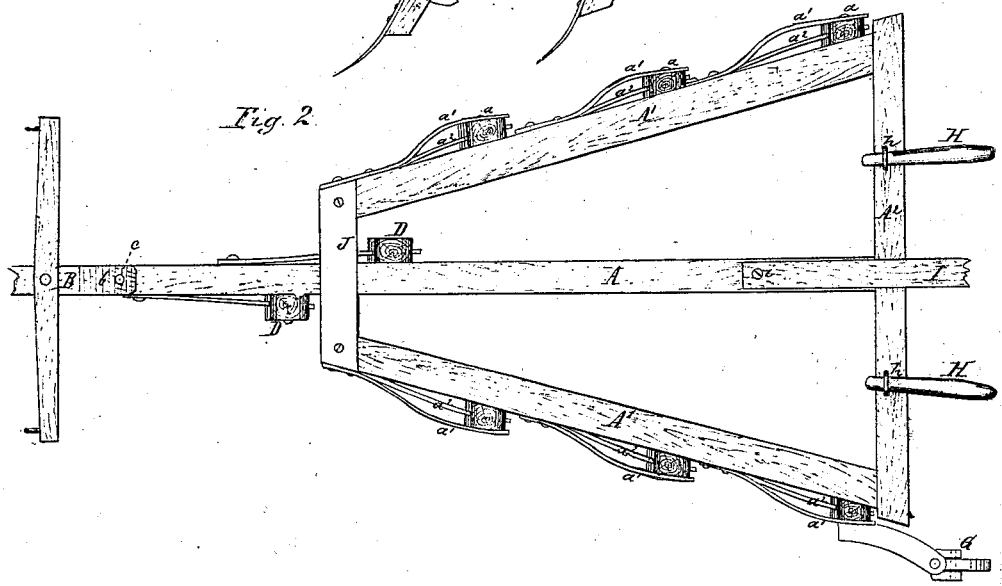

Figure 1 is a side elevation, and Fig. 2 a plan.

The object of this invention is to provide for public use a simple and convenient instrument in which the standards can be adjusted at different angles with the beams, as and for the purpose hereinafter specified.

In the drawings, the triangular frame of the instrument is represented at A A' A², A showing the center beam, A' A' the side beams, and A² the rear or cross beam.

B is the tongue or draft-pole, attached to the center beam by means of one or more bolts and nuts C, and capable of being adjusted for a deep or light draft by simply turning the beveled side $b$ down or up, respectively, and fastening it to the frame in that position.

D D are standards fastened one on each side of the center beam, near the forward end of the frame, or at any other point desired, and carrying light diamond-shaped shovels $d$ $d$, which sit at right angles to the center beam.

E E are long and F F short standards carrying triangular shovels, and attached to the side pieces, A' A', by means of bolts $a$ $a$, braces $a'$ $a'$, and the ordinary adjusting draft bars or braces, $a^2$ $a^2$. The long or short standards may be used as occasion requires, and may be adjusted at any points along the side beams, holes being made therein at suitable places for that purpose. The braces $a^2$ $a^2$ may be adjusted by means of wooden pins, or any friction-fastening that will yield to an immovable obstacle and prevent the breaking of the shovels or standards. The standards E F are made with one side beveled or oblique, as seen in Fig. 2, so that when the oblique side is placed against the side of the frame the shovel will be at right angles with the center beam, A; but when the opposite side is placed against the frame the shovel will be at right angles with the side piece, A', but inclined with reference to the center beam.

G G are wheels employed to regulate the depth to which the shovels shall be allowed to work. They are caster-wheels, made to follow the cultivator in any direction, and are vertically adjustable by setting the fastening-bolt $g$ up or down in holes prepared for the purpose.

H H are the handles, which are attached to the rear cross-beam by means of staples $h$ $h$, having screw-nuts to fasten them in place. The handles may be set inclining straight back and upward, as seen in Figs. 1 and 2, or they may be set so as to incline to one side or the other, as the character of the work may require.

I is a marking-gage, which is to be set on the same side as the row last made, with the point in or over the row or furrow.

J is a metallic strap employed to connect the front ends of the side pieces, A' A', and the center beam, A, and is fastened to the frame by screw-bolts or bolts and nuts, which can be tightened up when necessary.

In practical operation of this instrument the standards may be set so that the shovels will throw the dirt on one or the other side of the frame, the shovels standing in that case directly or obliquely across the center beam. Any number of shovels and standards may be employed, and in any position best adapted to their work. In putting in grain or cultivating ground for planting corn or cotton, or for other purposes, set all the shovels, both on side and center beams, using the handles inclined directly backward and upward, as seen in Fig. 2. For cultivating corn or cotton until it is from ten to fifteen inches high, take off the center-beam plows and use the side plows only, having the handles inclined to one side, so that the operator can hold them without walking upon the plants; and in plowing corn or cotton when it is from twenty to thirty inches high, take off the forward side plows and the center-beam plows and adjust the remaining plows along the frame at the proper distance from the rows, having the handles inclined laterally, as before.

Having thus described my invention, what I claim as new, and desire to secure by Letters Patent, is—

The standards E and F, having one straight and one beveled side, substantially as and for the purpose specified.

JOHN R. THOMAS.

Witnesses:
GEORGE T. HUMMEL,
D. H. BAUM.